UNITED STATES PATENT OFFICE.

JOHN HARGER, OF LIVERPOOL, AND HENRY TERREY, OF BISHOPS WALTHAM, ENGLAND; SAID TERREY ASSIGNOR TO SAID HARGER.

TREATMENT OR PURIFICATION OF MIXTURES OF HYDROGEN AND CARBON MONOXID, FOR THE SEPARATION THEREFROM OF THE LATTER.

1,366,176. Specification of Letters Patent. Patented Jan. 18, 1921.

No Drawing. Application filed April 18, 1918. Serial No. 229,325.

*To all whom it may concern:*

Be it known that we, JOHN HARGER and HENRY TERREY, subjects of the King of Great Britain, residing, respectively, at Liverpool, in the county of Lancaster, England, and Bishops Waltham, Hampshire, England, have invented new and useful Improvements in the Treatment or Purification of Mixtures of Hydrogen and Carbon Monoxid for the Separation Therefrom of the Latter, of which the following is a specification.

The present invention relates to an improved process for removing carbon monoxid from hydrogen or gases containing hydrogen.

When hydrogen is prepared on the large scale by passing water gas and steam over a catalyst, by passing steam over iron or by cooling water gas to liquefy carbon monoxid, for example, it usually contains so much carbon monoxid as to be unsuitable for many industrial purposes *e. g.* synthetic production of ammonia from nitrogen and hydrogen or for hardening fats with certain catalysts. It has been recognized therefore that further treatment is necessary to remove at least parts of the carbon monoxid and in particular it has been proposed to heat the gas to 450–500° C. with steam in presence of a catalyst in order to bring about the reaction, $$CO + H_2O \rightleftharpoons CO_2 + H_2.$$

This reaction carried out at a temperature of say 450° C., is reversible and complete conversion of carbon monoxide cannot be attained.

The steam may be added as such or it has been proposed to add air or oxygen for the purpose of heating the gas to the requisite temperature in which case of course the steam is formed *in situ*, since at the temperatures and under the conditions in question (400°–500° C.) oxygen and hydrogen readily unite to form water.

Our experiments show that using the most efficient catalysts, the temperature required for reasonable speed is at least 450°–500° C. and that from 1½ to 2% carbon monoxid is still left in the gas. As the equilibrium point between CO and $CO_2$ is not sufficiently near the value 100% $CO_2$, at these temperatures, it is clear that the method has inherent disadvantages if it is desired to remove all or nearly all the carbon monoxid.

Our invention depends on the discovery that by the aid of certain solid catalysts, it is possible in presence of hydrogen to bring about the reaction, $$2CO + O_2 = 2CO_2$$

by admitting air or oxygen in calculated amount or in slight excess and working at a temperature far lower than the temperature employed for the reaction, $$CO + H_2O = CO_2 + H_2$$

in such manner that the oxygen preferentially attacks the carbon monoxid rather than the hydrogen; the temperatures at which we work are preferably in the neighborhood of 100° to 300° C. The carbon dioxid is then removed as hereafter described or by known methods.

We find that in this way it is possible to destroy the carbon monoxid to such an extent that it is negligible for most if not all technical processes, and the process is cheap, since it is worked at a low temperature and does not require a complicated installation.

We will now discuss the catalysts we have so far found suitable, the temperature control, and other factors and give examples showing the results obtained experimentally.

The choice of catalyst is very wide and different catalysts may be employed under different conditions. The number of materials which can be employed is very large; some of the undermentioned materials are not suitable for use with very impure hydrogen for instance with hydrogen containing large quantities of other impurities besides carbon monoxid such as carbon dioxid steam sulfureted hydrogen, etc., while some act perfectly well in presence of these impurities.

In all cases however it is desirable to remove sulfureted hydrogen since all the catalysts act better in its absence, when operating over long periods. The catalysts act better in presence of large quantities of water vapor; in fact if the reaction is performed in presence of large quantities of carbon dioxid it is necessary to work in presence of steam to prevent the hydrogen from being attacked; indeed at a relatively high temperature in presence of large quantities of carbon dioxid, carbon monoxid may be produced instead of removed unless steam is present.

Broadly speaking there is a relationship between the temperature and the catalyst i. e. if a relatively active catalyst is used, the temperature required will be lower, and using the same catalyst in a more active form the temperature will be lower also. Thus copper oxid is very active and if the temperature is too high, the hydrogen would begin to be attacked, so that if very active modifications of copper oxid are used, the temperature should be as low as 120° C. or even 100° C. On the other hand, the catalyst composed of oxids of iron, chromium and thorium is relatively inactive at low temperatures and it retains its selective actions at 220° C. when its efficiency is therefore high since obviously the reaction velocity rises as the temperature increases; the limit is set by the fact that above a certain temperature the hydrogen begins to be attacked as well as the carbon monoxid. Thus the criterion of suitability for our process is that the activity of the catalyst at the temperature reaction must be such as to cause rapid preferential oxidation of carbon monoxid.

We have found that the following act more or less in inducing the combustion of carbon monoxid with oxygen in preference to that of hydrogen:—The substances referred to are various oxids of copper, of chromium, of iron, nickel, lead, mercury, bismuth, cerium, thorium, manganese, cobalt, zinc; mixtures of these oxids in various proportions act much better than the pure oxids.

We have found that various metals will act as the necessary catalyst such for example as copper and nickel.

We have found by numerous experiments that most satisfactory catalysts for the purpose are obtained by mixing several oxids such for example as oxids of iron, bismuth and cerium; oxids of iron, chromium and cerium; oxids of iron, chromium, aluminium and cerium; oxids of iron, chromium, cerium and thorium; oxids of iron, chromium, aluminium, cerium and thorium; oxids of iron, chromium and thorium; oxids of iron, chromium, aluminium and thorium and many other mixtures of oxids besides those mentioned can be used for the purpose and in the manner described.

In certain cases a mixture of two oxids is much more active than either of the oxids separately and a mixture of three much more active than the two. An addition of a small quantity of a third oxid in certain cases causes a large increase in activity compared with the activity of the two; in fact such an added oxid acts as a "promoter."

We prefer to employ the catalytic material used, in a finely divided state for instance in the form of a fine powder or in a porous condition preferably in the form of small porous lumps in the production of which binding agents or supports may have been employed, or soluble salts or mixture of soluble salts and pastes may be used to impregnate a suitable combustible material the mass being then dried and the combustible material removed by ignition or combustion so as to leave the catalyst in a highly porous and active state or condition and exposing the maximum surface. The powders or porous masses prepared as described may be arranged in one bed or layer or in several beds or layers for example on trays. The catalytic material may be prepared by soaking some combustible thread or woven fabric with soluble salts of the various constituents or with partly soluble salts partly pastes, drying the resulting product, then igniting the same either in the position in which it is to be used in the process or otherwise by which means a network of the catalytic material is obtained exposing a very large surface.

Such fabric may be impregnated with sufficient of the catalyst forming material to give a mass quite strong enough to be movable without being damaged and may be made in the form of square or circular disks of gauze so as to give very large surface with the minimum of material and offer the least resistance to the passage of the gases or they may be made in the form of tubes impregnated with the catalytic forming material and these tubes may contain pieces of the catalytic material shaped so as to produce turbulence and break up stream line motion in the gas. If desired soluble (inactive) salts may be employed as supports for the catalyst. In order to obtain an intimate mixture of the constituents which is desirable and also obtain them in finely divided or porous condition salts for instance nitrates or oxalates can be mixed together or obtained by evaporation of a solution of such salts in the desired proportions, or a mixture of the hydroxids or other suitable compounds may be taken and calcined preferably avoiding too high a temperature. The temperature of reaction is preferably kept at or in the neighborhood of 150–250° C. but this range is not rigid. The gases may be passed through a heat interchanger so that the incoming gases are heated by the outflowing gases whose temperature has been raised by the heat of reaction. If the hydrogen is prepared from water gas the gases may be led to the catalyst direct from the heat interchanger or apparatus in which the steam reacts with the carbon monoxid to give hydrogen and carbon dioxid.

The percentage of added air or oxygen may be regulated automatically in accordance with the percentage of CO in the gas and this CO or the $CO_2$ in the residual gas after treatment may be automatically determined. The necessary oxygen may be evolved by electrolysis and automatically added either alone or admixed with the electrolytic hydrogen.

*Example 1.*

Dissolve 194 parts (by weight) of ferric nitrate, 5 parts of ammonium bichromate and 1 part of thorium nitrate in water; evaporate the mixed solution to dryness and calcine the mixture until the nitrates are decomposed. This is best done in a current of gas to remove the evolved oxids of nitrogen more readily and completely.

*Example 2.*

The same materials and same quantities as in example 1 are taken with the substitution of one part of cerium nitrate for the thorium nitrate.

*Example 3.*

The same mixing of nitrates as in 1 with the substitution of a mixture of thorium nitrate and cerium nitrate for thorium alone.

*Example 4.*

The same mixing of nitrates as 1, 2 or 3 with the addition of 20 parts of aluminium nitrate.

Catalysts prepared as above described are operative at 190°–270°.

*Example 5.*

Oxidized copper wire is made by alternate oxidation and reduction at low temperatures. It is effective at temperatures from 120 to 170° C.

A commercial sample of "granular copper oxid" was found to be very effective at 120° to 130° C.

In some cases we may pass the gases mixed with oxygen over two catalysts in series *e. g.* an iron oxid composition followed by a copper oxid catalyst at a lower temperature if the gases were initially hot or vice versa if the gases were initially cold.

An illustrative experiment may be added showing the influence of temperature and speed of gas in the destruction of CO, using Example 2.

10 c. c. catalyst space. Hydrogen containing 1.5% CO with air.

| | | |
|---|---|---|
| 250° C. | Slow speed | 1.5% $CO_2$ |
| 255° C. | 3.6 liters per hour | 1.5% $CO_2$ |
| 260° C. | 10.5 liters per hour | 1.5% $CO_2$ |
| 255° C. | 15 liters per hour | 1.5% $CO_2$ |
| 240° C. | 12 liters per hour | 1.5% $CO_2$ |
| 215° C. | 9 liters per hour | 1.5% $CO_2$ |
| 190° C. | 9 liters per hour | 1.0% $CO_2$ |

It will be seen that in each case (except the last experiment at 190° C.) the conversion of CO to $CO_2$ is complete for practical purposes.

Excellent results are obtained from the catalysts, particularly the oxids, metal and mixtures, we have specified. Other compounds capable of alternate oxidation and reduction may be used provided they possess the desired property of sufficiently accelerating the reaction, $$2CO + O_2 \rightarrow 2CO_2$$

at a temperature low enough not to cause combination between hydrogen and oxygen to more than a very slight extent. Our invention is not restricted to particular catalysts since it is based on the process of removing CO by combination with oxygen as hereinafter claimed. The suitability of any catalyst for our process is readily determined by trial.

We declare that what we claim is:

1. The process of removing carbon monoxid from gases containing hydrogen which comprises causing the carbon monoxide to combine with added oxygen in the presence of a suitable solid catalyst at a temperature so low that the re-action $$2CO + O_2 = 2CO_2$$

does occur and the reaction, $$2H_2 + O_2 = 2H_2O$$

does not occur to more than a very slight extent and then removing the carbon dioxid.

2. The process of treating gases containing hydrogen and carbon monoxid which comprises causing the carbon monoxide to combine with added oxygen in the presence of a suitable metallic oxid as catalyst at a temperature so low that the reaction $$2CO + O_2 = 2CO_2$$

does occur and the reaction $$2H_2 + O_2 = 2H_2O$$

does not occur to more than a very slight extent and then removing the carbon dioxid.

3. The process of removing carbon monoxid from gases containing hydrogen which comprises causing the carbon monoxide to combine with added oxygen in the presence of a plurality of metallic oxids as catalysts at a temperature so low that the reaction $$2CO + O_2 = 2CO_2$$

does occur and the reaction $$2H_2 + O_2 = 2H_2O$$

does not occur to more than a very slight extent and then removing the carbon dioxid.

4. The process of removing carbon monoxid from gases containing hydrogen which comprises causing the carbon monoxide to combine with added oxygen in the presence of a suitable solid catalyst and a promoter at a temperature so low that the reaction $$2CO + O_2 = 2CO_2$$

does occur and the reaction $$2H_2 + O_2 = 2H_2O$$

does not occur to more than a very slight extent and then removing the carbon dioxid.

5. The process of removing the carbon monoxid from gases containing hydrogen which comprises causing the carbon monoxid to combine with added oxygen in the presence of a mixture of iron oxid with another metallic oxid as catalyst at a temperature so low that the reaction $$2CO + O_2 = 2CO_2$$

does occur and the reaction $$2H_2 + O_2 = 2H_2O$$

does not occur to more than a very slight extent and then removing the carbon dioxid.

6. The process of treating a gas consisting substantially of hydrogen with small quantities of carbon monoxid which comprises causing the carbon monoxid to be preferentially oxidized by a suitable catalyst at about 100° to 300° C. and then removing the carbon dioxid.

7. The process of removing carbon monoxid from gases containing hydrogen and steam and a large amount of carbon dioxid which comprises causing the carbon monoxid to combine with added oxygen in the presence of a suitable solid catalyst at a temperature so low that the reaction $$2CO + O_2 = 2CO_2$$

does occur and the reaction $$2H_2 + O_2 = 2H_2O$$

does not occur to more than a very slight extent and then removing the carbon dioxid.

8. The process of removing carbon monoxid from gases containing hydrogen and carbon dioxid which comprises adding steam and then causing the carbon monoxid to combine with added oxygen in the presence of a suitable solid catalyst at temperatures so low that the reaction $$2CO + O_2 = 2CO_2$$

does occur and the reaction $$2H_2 + O_2 = 2H_2O$$

does not occur to more than a very slight extent and then removing the carbon dioxid.

9. The process of removing the carbon monoxid from gases containing hydrogen by preferential catalytic oxidation of said carbon monoxid at a temperature so chosen that hydrogen is not appreciably oxidized but that the reaction velocity is as high as possible and then removing the carbon dioxid.

10. The process of removing carbon monoxid from gases containing hydrogen which consists in continuous selective catalytic oxidation of carbon monoxid by oxygen in the presence of a catalyst capable of causing oxidation of both carbon monoxid and hydrogen but under such conditions that very little of the hydrogen is oxidized and then removing the carbon dioxid.

11. The process of treating gases containing hydrogen and small quantities of carbon monoxid which includes the step of causing the carbon monoxid to combine with added oxygen in the presence of a suitable solid catalyst at a temperature so low that the reaction $$2CO + O_2 = 2CO_2$$

does occur and the reaction $$2H_2 + O_2 = 2H_2O$$

does not occur to more than a very slight extent.

In witness whereof, we have hereunto signed our names this 26th day of March, 1918, in the presence of two subscribing witnesses.

JOHN HARGER.
HENRY TERREY.

Witnesses:
W. H. BEESTON,
JOHN McLACHLAN.